(No Model.)
D. BEST.
COMBINED HEADER AND THRASHER COUPLING.
No. 369,498. Patented Sept. 6, 1887.
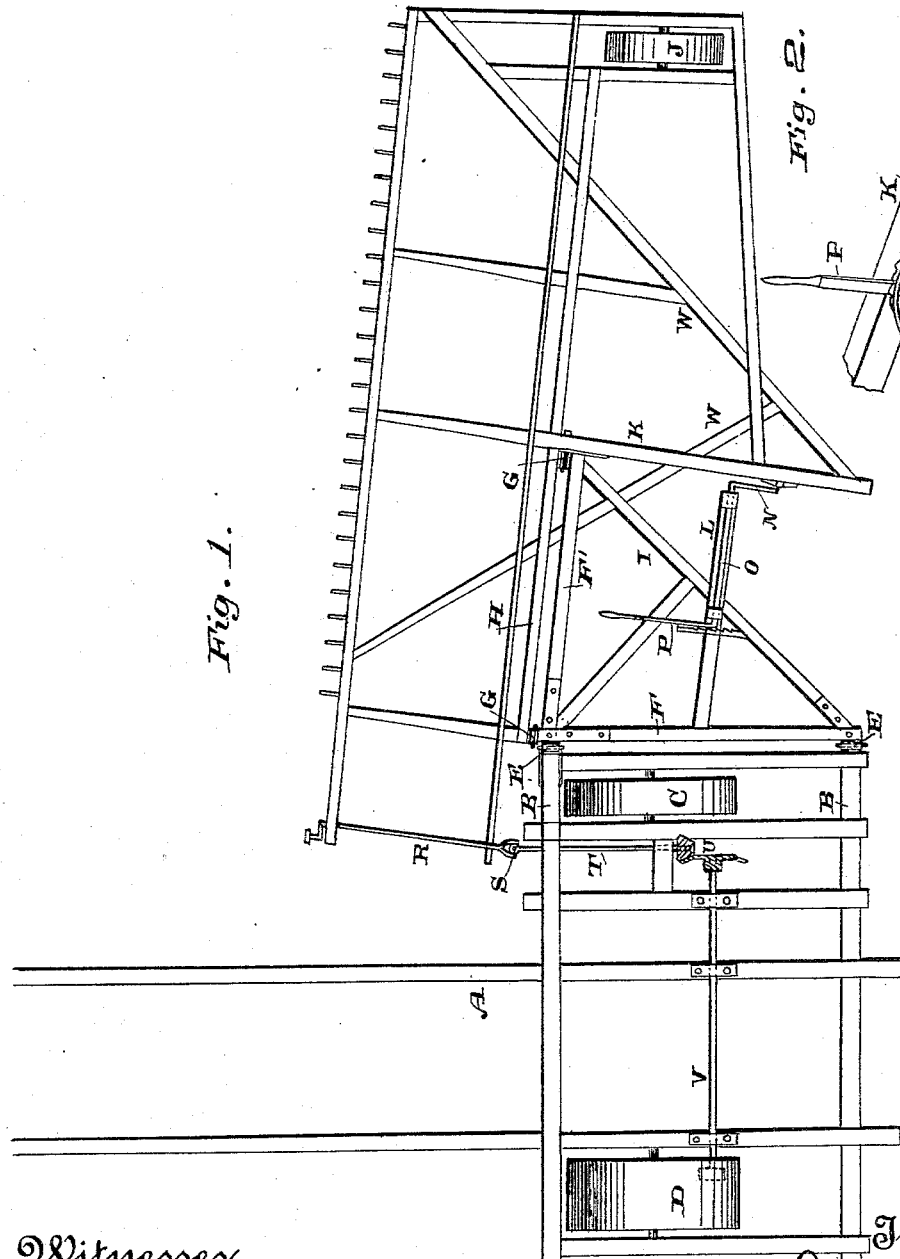
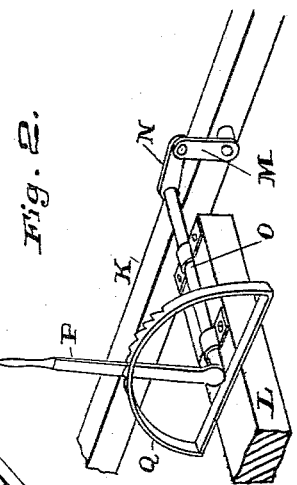
Witnesses,
Geo. H. Strong.
J. H. Rouse.
Inventor,
Daniel Best.
By Dewey & Co.
Att'ys

UNITED STATES PATENT OFFICE.

DANIEL BEST, OF SAN LEANDRO, CALIFORNIA.

COMBINED HEADER AND THRASHER COUPLING.

SPECIFICATION forming part of Letters Patent No. 369,498, dated September 6, 1887.

Application filed March 22, 1887. Serial No. 232,012. (No model.)

*To all whom it may concern:*

Be it known that I, DANIEL BEST, of San Leandro, Alameda county, State of California, have invented an Improvement in Combined Header and Thrasher Couplings; and I hereby declare the following to be a full, clear, and exact description of the same.

My invention relates to a coupling for uniting the heading and thrashing portion of a combined harvesting apparatus.

It consists of a triangular frame-work hinged to the side of the thrashing-machine, and having the reaping or cutting portion of the apparatus hinged to the front side of this triangular frame, all of which will be hereinafter claimed, and more fully explained by reference to the accompanying drawings, in which—

Figure 1 is a plan view of the apparatus. Fig. 2 is a view showing the mechanism for raising and lowering the sickle.

A is the frame of the thrashing-machine, having the transverse timbers extending out to one side, as shown at B, so that one of the bearing-wheels, C, is journaled in this projecting portion of the frame, while the other one, D, is journaled at the opposite side of the thrashing-machine.

Upon the ends of the transverse timbers B are fixed strong hinges E, and to these hinges one of the short sides, F, of a triangular frame is connected. The other short side, F', which is not quite at right angles with the first one, is also provided with hinges G, to which the rear timber, H, of the header-frame is hinged, so that the header-frame may have a movement about these hinges, which serve as an axis. The hypotenuse or long side I of the triangle serves as a brace, extending from the point of one of the short sides to the point of the other; and transverse timbers L may also be secured to the triangular frame for greater stiffness, if desired. The triangle is preferably an equilateral triangle, the two sides F and F' not being exactly at right angles with each other and forming a slightly acute angle at the point where they are united, and are hinged to the main or thrasher frame at the front. From this construction the sickle-frame will stand at an angle with the main or thrasher frame, as shown in Fig. 1, and the grain-wheel J, which supports the outer end of the sickle-frame, is in exact line with the two main wheels C and D.

In order to raise and lower the sickle or cutting portion, the timber K, which extends back nearly centrally on the sickle-frame, passes by the ends of the timbers F' and L of the triangle, and its rear end is connected by a link, M, with a short crank-arm, N, which is fixed upon the shaft O, this shaft being journaled upon the beam L, as shown. At the end of the shaft O is a hand-lever, P, of sufficient length, so that the operator, who stands upon a platform upon the triangular frame, can reach the lever and move it, so as to turn the sickle-frame about its fulcrum-hinges G G, and thus raise or lower the sickle at pleasure. A rack, Q, serves to hold the lever at any desired point.

The sickle is driven by means of a crank at the end of the tumbling-shaft R T, and by means of the beveled gearing (shown at U) power is transmitted from the main driving-wheel D through the shaft V. It has hitherto been customary to connect the header-frame by hinges or pivots directly with the thrasher-frame; but in my invention I interpose the triangular frame between the two, this frame being hinged first to the thrasher, and then having the header-frame hinged to it. This produces a very strong and flexible union between these two parts, enabling me to support the header or sickle carrying portion of the frame along a considerable distance of its length, thus preventing turning and twisting, which usually occur with very long header-frames. In addition to this, the frame is also braced by diagonal timbers, as shown at W, and from the manner in which the header-frame is hinged to the triangle these braces extend in each direction outward toward the front from a nearly central point at the rear, so as to form an equilateral triangle, differing in this respect from other machines in which the diagonal braces extend from one end to the other of the machine.

Having thus described my invention, what I claim as new, and desire to secure by Letters Patent, is—

In a combined header and thrashing-machine, the combination of the thrasher and header frames and a triangular frame interposed between them, hinged to the former on the line of draft and to the latter on a line transverse thereto and trending obliquely to the rear, said joints being at the corners of the short sides of the triangular frame, substantially as herein described.

In witness whereof I have hereunto set my hand.

DANIEL BEST.

Witnesses:
S. H. NOURSE,
H. C. LEE.